Sept. 25, 1956    A. E. BRATT    2,764,437
PRESS FITTING JOINT AND MEANS FOR
MAKING AND SEPARATING THE SAME
Filed May 31, 1951
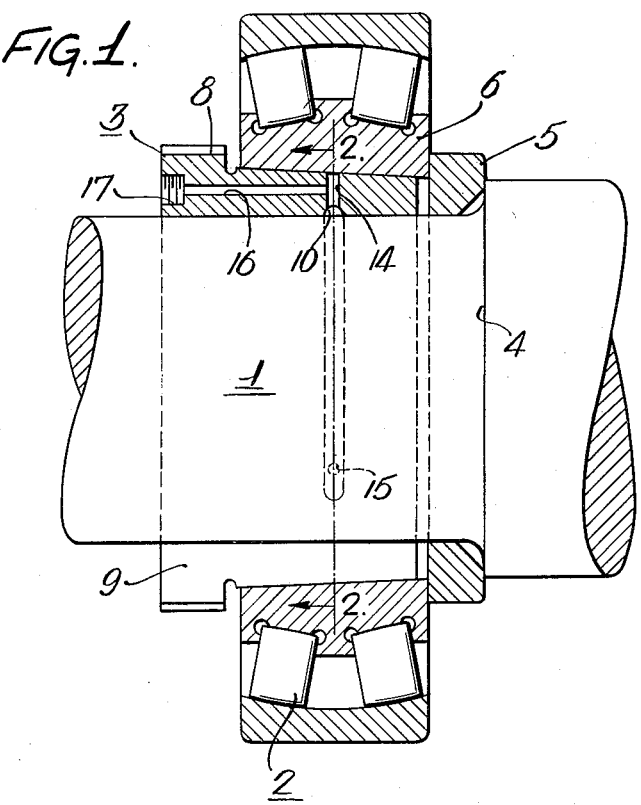
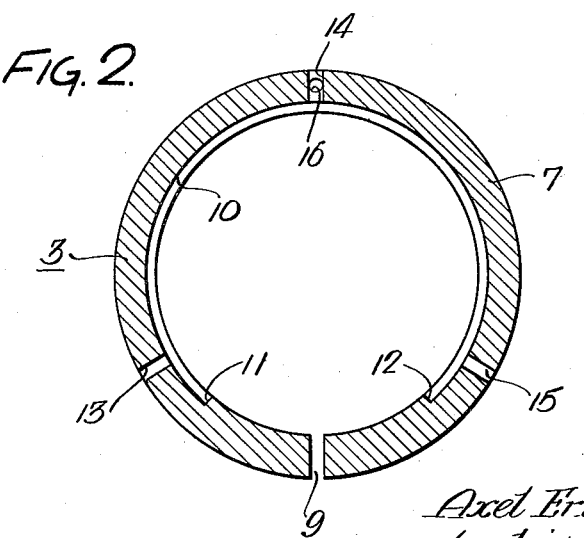
Inventor:
Axel Erland Bratt
by his Attorneys
Howson & Howson

United States Patent Office 2,764,437
Patented Sept. 25, 1956

2,764,437

PRESS FITTING JOINT AND MEANS FOR MAKING AND SEPARATING THE SAME

Axel Erland Bratt, Goteborg, Sweden, assignor to SKF Industries, Inc., Philadelphia, Pa., a corporation of Delaware Application May 31, 1951, Serial No. 229,080

8 Claims. (Cl. 287—52)

This application is a division of my co-pending United States application Serial No. 492,762, filed June 29, 1943, which application has matured into United States Letters Patent No. 2,564,670 of August 21, 1951.

The present invention relates to a press fitted or shrunk joint and has for its purpose to facilitate the making of the joint or the separation thereof. Hitherto the assembling and especially the separation of such joints has met with considerable difficulty as they have usually been made by shrinking one of the parts onto the other and it has been found difficult to attain the necessary difference in temperature between the parts in order to loosen the joint. Alternatively it is difficult to obtain the necessary forces for displacing the members of the joint relative each other. According to the present invention arrangements are made for introducing under pressure a fluid, either liquid or gaseous, between the engaging surfaces so that the metallic contact is relieved over at least the greater part of the surfaces whereby these may be more easily displaced relative each other.

In a specific sense, the invention contemplates the provision of novel means for facilitating the mounting and demounting of antifriction bearings on shafts, said means including a wedging member interposed between the bearing and the shaft and having means for application of pressure fluid both to the shaft and bearing-engaging surfaces of said member In the accompanying drawings:

Fig. 1 is a sectional view showing a roller bearing and shaft assembly in accordance with the invention, and Fig. 2 is a sectional view of one of the elements of the assembly as though taken on the line 2—2, Fig. 1.

With reference to the drawings, the reference numeral 1 indicates a shaft upon which an antifriction bearing 2 is mounted through the medium of an interposed sleeve 3. The shaft is shouldered at 4 and a ring 5 is interposed between the shoulder and the bearing and forms an abutment for the inner race ring 6 of the bearing. The outer surface of the poriton 7 of the sleeve 3 which is interposed between the shaft and bearing is tapered, and the inner bore of the ring 6 of the bearing is correspondingly tapered to insure full contact over the interengaged surfaces.

The sleeve, which has a terminal flange 8 at its thicker end, is split at 9, and a groove 10 is formed in the inner surface of the sleeve, said groove extending circumferentially and terminating at 11 and 12 in points remote to the split. From the groove 10 a plurality (three in the present instance) of holes, 13, 14, and 15 respectively, extend through the sleeve to the outer surface thereof said holes intersecting said outer surface in points which locate them in the shaft and bearing assembly approximately centrally of inner race ring 6 of the bearing. The groove 10 is similarly located in a position remote to both ends of the sleeve. A passage 16, extending from the flanged end of the sleeve axially to the hole 14, establishes a channel of communication between the groove 10, and holes 13, 14 and 15, and an exposed surface of the assembly. As shown at 17, the outer end of the passage 16 is counterbored and threaded for a purpose described below.

Assume that the bearing has been mounted on the shaft with a heavy press fit between the sleeve 3 and both the shaft and the inner ring 6 of the bearing, and that it is now desired to remove the bearing from assembly. The outer end of the passage 16 is then connected to a source of a suitable pressure fluid, for example oil, such connection being facilitated by the threads 17 at the outer end of the passage. The pressure of the oil must be as great at least as the specific pressure between the engaging surfaces of the sleeve and shaft and of the sleeve and bearing so that the oil may force its way between the said surfaces. The oil thus introduced and distributed by way of the groove 10 and holes 13, 14 and 15, forms films between the inner and outer surfaces of the sleeve and the confronting surfaces of the shaft and bearing respectively and make it possible to displace the sleeve axially with respect both to the shaft and bearing by application of forces of relatively low order and without damage to the said surfaces. The oil film may be so thin that it relieves the metallic contact between the surfaces but does not materially expand or contract the engaging parts.

The same procedure may be used in obvious manner to aid in effecting the force fit betweeen the sleeve and the shaft and bearing. The oil introduced in this operation quickly disappears from between the surfaces and does not affect the strength of the joint and its ability to transmit power.

Pressure of the oil between the tapered surfaces of the sleeve and inner bearing ring will have an axial component tending to force the sleeve and bearing apart in the axial direction. If the degree of taper is sufficiently great, the parts may be separated under this axial force alone. Whereas, in the illustrated embodiment, the bearing is prevented from moving axially away from the sleeve, and the separation must therefore be effected by axial movement of the sleeve alone, the oil film between the sleeve and shaft will aid materially in the separating operation.

I claim:

1. A joint comprising an inner cylindrical member, an outer annular member surrounding said inner member, in spaced relation, said inner and outer members having outer and inner confronting surfaces, respectively, and an intermediate annular member having inner and outer surfaces forcibly engaging the respective confronting surfaces of said inner and outer members and confined under compression therebetween, and means for introducing pressure fluid simultaneously between the said engaging surfaces of said members and at points intermediate the edges thereof to thereby form a film of said fluid between said engaging surfaces.

2. A joint according to claim 1 wherein the intermediate member comprises channels for passage of the fluid simultaneously to the said engaging surfaces.

3. A joint according to claim 2 wherein the intermediate member is provided with a circumferentially extending groove in a peripheral surface thereof together with holes extending from the groove to the opposite peripheral surface, and an axial channel extending from one end of said member for admission of fluid to the said holes and groove.

4. A joint according to claim 1 wherein the intermediate member is split axially.

5. A joint according to claim 1 wherein at least one of the pairs of engaging surfaces between the said intermediate annular member and the respective confronting surfaces of the said inner and outer members is tapered axially.

6. A joint according to claim 5 wherein the degree of taper is such as to enable the tapered engaging surfaces to separate axially solely under influence of the axial component of the fluid pressure.

7. A shaft and antifriction bearing assembly comprising in combination, a shaft, a bearing comprising an inner race ring surrounding the shaft in spaced relation and having an axially tapered bore, and an axially split sleeve interposed and confined under compression between the shaft and ring, said sleeve having a tapered outer surface forcibly engaging the tapered bore of said ring and an inner surface forcibly engaging the surface of said shaft, said sleeve having channels for admission of pressure fluid between said tapered engaging surfaces of said sleeve and ring and between said engaging surfaces of said sleeve and shaft to thereby form a film of said fluid between said engaging surfaces.

8. For separating the elements of a joint comprising an inner cylindrical element, an intermediate sleeve element surrounding and forcibly engaging the cylindrical surface of the inner element, and an outer annular element surrounding and forcibly engaging the outer surface of the sleeve element, and wherein said sleeve element is held under compression between the inner and outer elements, the method which comprises as a step thereof introducing a fluid under pressure simultaneously between the outer and inner surfaces of the intermediate element and the respective engaging surfaces of the outer and inner elements and thereby forming between said engaging surfaces a thin film of said fluid without material expansion or contraction of said elements.

References Cited in the file of this patent

UNITED STATES PATENTS

| | | |
|---|---|---|
| 123,413 | Newell | Feb. 6, 1872 |
| 851,419 | Hess | Apr. 23, 1907 |
| 961,375 | Seabrook | June 19, 1910 |
| 1,843,463 | Tawresey | Feb. 2, 1932 |
| 1,959,901 | Buehle | May 22, 1934 |
| 2,084,439 | Hamer | June 22, 1937 |
| 2,348,293 | Hamer | May 9, 1944 |

FOREIGN PATENTS

| | | |
|---|---|---|
| 121,014 | Australia | Feb. 12, 1946 |
| 800,533 | France | July 7, 1936 |